Patented June 7, 1938

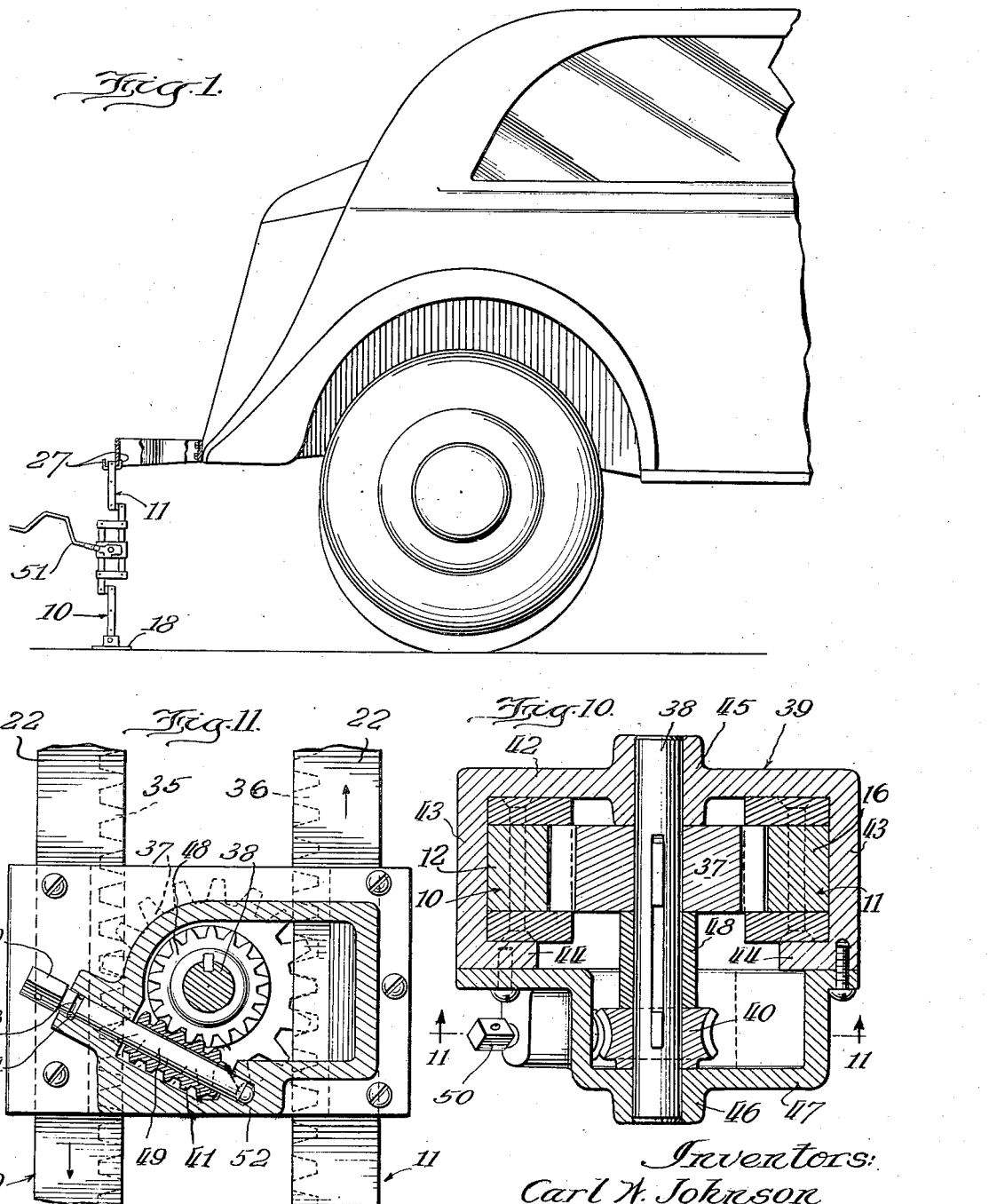

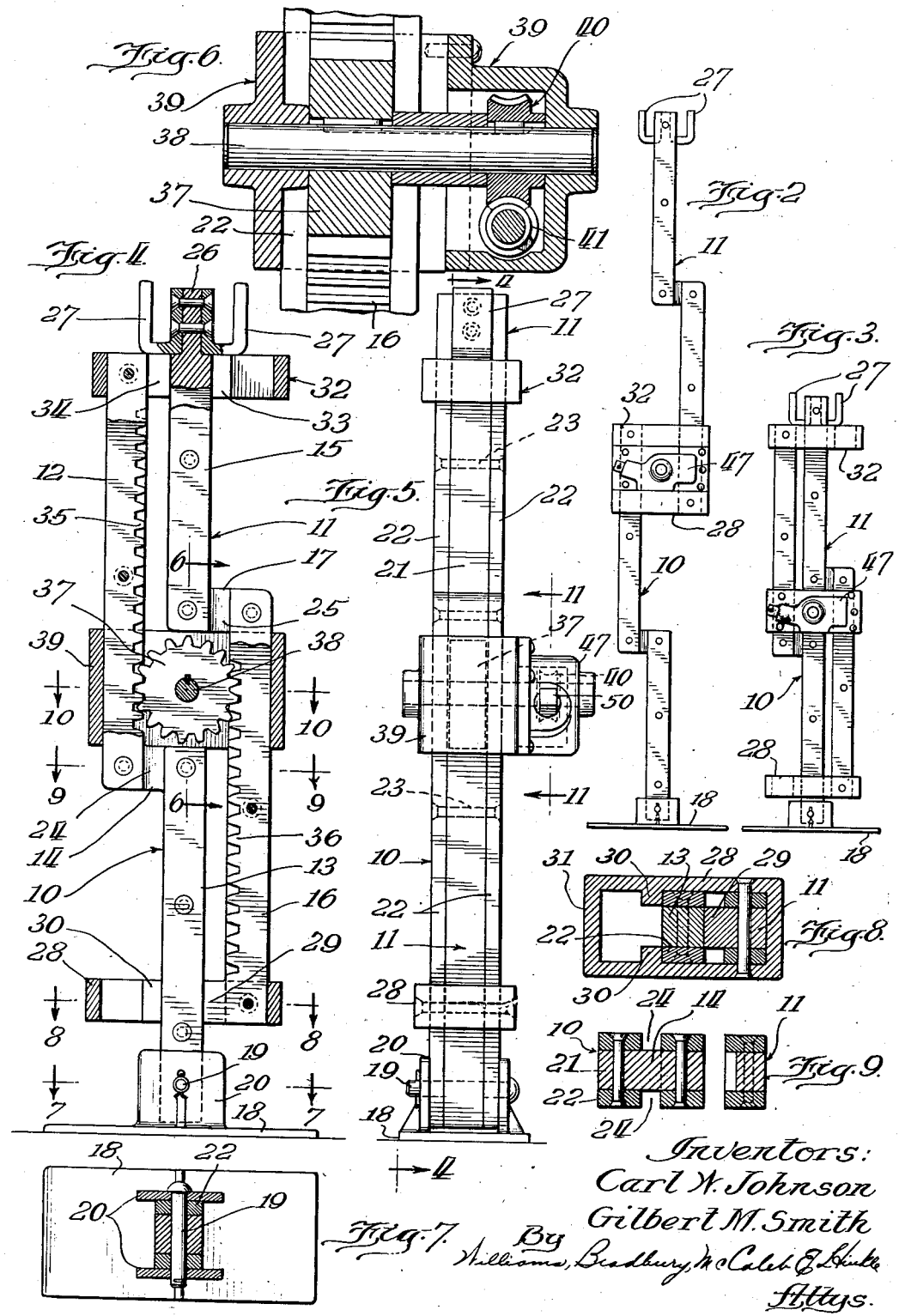

2,119,953

UNITED STATES PATENT OFFICE 2,119,953

AUTOMOBILE JACK

Carl W. Johnson, Glencoe, and Gilbert M. Smith, Congress Park, Ill.; said Smith assignor to said Johnson Application April 22, 1935, Serial No. 17,644

4 Claims. (Cl. 254—97)

This invention relates to automobile jacks generally, and in particular to automobile jacks adapted to be applied to the bumper of an automobile and to be operated with ease and facility by a person standing clear of the vehicle.

One of the objects of the present invention is to provide an improved automobile jack.

A further object of the invention is to provide an automobile jack in which the power is applied at an intermediate point and in which the point of application of power rises as the jack extends, and vice versa.

A further object of the invention is to provide an automobile jack which can be contracted into small compass and which is capable of extension to a remarkable degree.

A further object of the invention is to provide an automobile jack in which the load is communicated between the major elements in an advantageous fashion.

Other objects, advantages and capabilities of the invention will readily appear from the following description of a preferred embodiment thereof, taken in conjunction with the accompanying drawings, in which Figure 1 is a side elevation showing the jack in operation elevating one wheel of an automobile;

Fig. 2 is a side elevation of the jack, on a larger scale, showing the same in fully extended position;

Fig. 3 is a similar view showing the jack in retracted position;

Fig. 4 is a vertical sectional view of the jack in its retracted position, the section being taken on the line 4—4 of Fig. 5;

Fig. 5 is a front elevation of the jack;

Fig. 6 is a sectional detail view, taken on the line 6—6 of Fig. 4;

Fig. 7 is a sectional detail view, taken on the line 7—7 of Fig. 4;

Fig. 8 is a sectional detail view, taken on the line 8—8 of Fig. 4;

Fig. 9 is a sectional detail view, taken on the line 9—9 of Fig. 4;

Fig. 10 is a sectional detail view, taken on the line 10—10 of Fig. 4, and

Fig. 11 is a sectional detail view, taken on the line 11—11 of Fig. 10.

Referring to the drawings, and particularly to Fig. 4, it will be seen that the jack comprises two elongated bars or members 10 and 11 which are vertically directed in the normal operative position of the jack and are relatively movable for the purpose of adjusting the effective length of the jack. Each of these bars or elements comprises two major vertical lengths or portions which are offset slightly. Thus the bar 10 comprises an upper portion 12 and a lower portion 13 connected by a transverse element 14 in such a manner that the portions 12 and 13 are parallel and offset. The bar 11 comprises an upper portion 15 and a lower portion 16 connected by a portion 17. The lower end of the bar 10 is pivotally mounted on a base 18 by means of a pivot 19 which extends through an opening near the lower end of the bar 10 and through openings in lugs or webs 20 which stand up from the base 18. This pivotal connection allows the base to rest squarely upon the surface of the ground where the axis of the extended jack elements lies out of normal with the supporting surface.

The bar 10 may comprise a central portion 21 of the same outline as that of the bar 10 shown in Fig. 4, and the portion 14 may be an integral part thereof. The vertical portions 12 and 13 of the bar 10 are built up by the addition of side plates 22 thereof, which side plates are held secured to the central bar portion 21 by means of rivets 23.

As best seen in Fig. 9, the relation of the plates 22 is such that gaps 24 are provided at the horizontal portion 24 of the bar 10. The purpose of these gaps will hereinafter appear. The construction of the bar 11 is substantially similar and in order to avoid confusion in the drawings, the side plates with which it is built up are not designated by number. The gap at the horizontal portion 17 of the bar 11 is indicated by the reference numeral 25 on Fig. 4.

At its upper end the bar 11 is reduced, as shown at 26 in Fig. 4. To this reduced end are secured hook members 27 which are adapted to receive an automobile bumper or an automobile bumper bracket for the elevation of one corner of the car. The manner in which the bumper is engaged by one of the hooks 27 is clearly shown in Fig. 1.

At its lower end the bar 11 is provided with a guide member 28 which engages either or both of the parts 12 and 13 of the bar 10. As best seen in Figs. 4 and 8, the bar 11 is provided with a laterally projecting portion 29 which bears against one face of the part 13 of the bar 10. The guide member 28 is in the form of a substantially rectangular strap provided with inwardly directed projections 30 which engage the rear face of the part 13 of the bar 10 in the retracted position of the jack. It will be seen that the projections 29 and the projections 30 ride upon opposite faces of the portion 13 of the bar 10 during the initial extension of the jack. With continued extension of the jack, the projections 30 pass freely through the recesses 24 and bear against the faces of the straps 22 of the portion 12 of the bar 10. The other face of the portion 12 of bar 10 is engaged by the extreme wall 31 of the guide member 28. While the projections 30 are in the slots or gaps 24, both portions 12 and 13 are engaged by the strap 28. When the jack is extended beyond this point, the portion 12 only of the bar 10 is engaged by the guide member 28.

At the upper end of the bar 10 is mounted a guide member 32 which is substantially similar to the guide member 28 which has just been described. The guide member 32 is likewise in the form of a rectangular strap provided with internal projections 33 which are adapted to pass through the gaps 25 and engage the portions 15 and 16 of the bar 11. At its upper end the portion 12 of the bar 10 is provided with an integral portion 34 which engages the face of the portion 15 of the bar 11 opposite the face engaged by the projections 33.

It is to be noted that the guiding connections just described maintain the length 15 of the bar 11, to which the load is applied, in alignment with the portion 13 of the bar 10 which communicates the thrust to the base 18.

The upper portion 12 of the bar 10 has rack teeth 35 formed in the central portion 21, the plates 22 presenting smooth surfaces for engagement with the projections 30 of the guide member 28. The lower portion 16 of the bar 11 has ratchet teeth 36 formed on its central part, the plates applied to either side of this central part presenting flat surfaces to the projections 33 of the guide member 32. In the retracted position of the jack, as shown in Fig. 4, the lower teeth 35 are located opposite the upper teeth 36. Both these sets of teeth are engaged by a spur gear 37 which is keyed upon a shaft 38. The shaft 38 is rotatably mounted in a housing 39. The housing 39 extends around the bars 10 and 11 and is provided with internal surfaces which bear against the exterior surfaces of the portions 12 and 16 of the bars 10 and 11, respectively. The shaft 38 has keyed or otherwise rigidly secured thereon a worm gear 40 which is actuated by means of a worm 41 mounted in the housing 39.

As best seen in Fig. 10, the housing 39 comprises a C-shaped portion having one side 42, two ends 43, and two overhanging flanges 44. The shaft 38 has one end journaled in a boss 45 on the side 42. Its other end is journaled in a boss 46 in a cap member 47, which is mounted on the flanges 44. The worm gear 40 is located within the cap 47 and is spaced from the spur gear 37 by means of a sleeve 48. The worm 41 is keyed upon a shaft 49 which has bearings in the cap 47. It is mounted obliquely in the cap and terminates on the outside with a square or other suitable non-round formation 50 which may readily be engaged by the socket of a hand-operated crank 51. The inner end of the shaft 49 is concave so as to engage a bearing ball 52, as best shown in Fig. 11. Near its outer end the shaft 49 is provided with an annular groove 53. A pin 54 passing through this groove maintains the shaft against withdrawal.

It will readily be understood that when the worm 41 is actuated by the crank 51 in either direction, the worm gear 40 is actuated, causing the spur gear 37 to rotate. This rotation, owing to the engagement of the spur wheel with the teeth 35 and 36, causes a relative movement between the bars 10 and 11. This movement results either in the extension or retraction of the jack as a whole, depending upon the direction of rotation of the crank 51. It will be noted that the engagement of the worm 41 with the worm gear 40 provides a non-reversible mechanical connection. By the term "non-reversible" we do not mean that the rotating elements cannot be rotated in one direction and in the opposite direction. We mean that the worm 41 is the driving element and the worm gear 40 is the driven element and that this relation is maintained and does not become reversed irrespective of the weight supported by the jack.

With reference to Figs. 2 and 3, it will be seen that the point of operation, that is, the point at which the crank 51 is attached, is substantially at the center of the jack and that this central position is maintained, notwithstanding the extension or retraction of the jack. The result is that when the jack is first placed in position, the point of application of the actuating mechanism is remote both from the ground and from any part of the automobile. As the automobile is elevated by the actuation of the jack, the operator can assume a more erect position. At the same time the clear relation between the operating mechanism, the bumper and the ground is maintained.

With reference to Fig. 2, it will be noted that the upper portion 15 of the bar 11 is in alignment at all times with the lower portion 13 of the bar 10 and the thrust borne by these portions is in alignment therewith.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In a jack, in combination, a pair of relatively movable supporting elements, each comprising an upper and lower longitudinal portion in parallel and offset relation, the upper portion of one element being in alignment with the lower portion of the other element, rack teeth on the upper portion of one element, rack teeth on the lower portion of the other element, guide means mounted on each element adapted to engage the aligned and non-aligned portions of the other element successively as the jack is operated, a carriage mounted on both elements, and actuating mechanism on said carriage in operative engagement with said racks.

2. In a jack, in combination, a pair of relatively movable supporting elements, each comprising an upper and lower longitudinal portion in parallel and offset relation, the upper portion of one element being in alignment with the lower portion of the other element, rack teeth on the upper portion of one element, rack teeth on the lower portion of the other element, guide means rigidly mounted on each element provided with formations for engaging the aligned and non-aligned portions of the other element in succession as the jack is operated, thereby maintaining said upper portion of one element in alignment with said lower portion of the other element, a carriage mounted on both elements, and actuating mechanism on said carriage in operative engagement with said racks.

3. In a jack, in combination, a pair of relatively movable supporting elements, each of said supporting elements comprising upper and lower longitudinal portions which are parallel but laterally offset, the lower portion of one of said supporting elements being in axial alignment with the upper portion of the other, the other two of said supporting element portions being provided with opposed sets of rack teeth adapted to cooperate with a common pinion, a carriage mounted on and movable relative to both of said supporting elements, a pinion mounted in said carriage and engaging the two sets of rack teeth, said pinion being disposed with its axis intersecting the common longitudinal axis of the aligned portions of the supporting elements and lying between the opposed ends of said aligned portions, means for rotating said pinion to effect relative movements of said supporting elements in opposite directions, and a guide member rigidly carried at an end of each supporting element and adapted to engage the aligned and offset portions of the other supporting element in succession as the jack is operated.

4. In a jack, in combination, a pair of relatively movable supporting elements, each of said supporting elements comprising upper and lower longitudinal portions which are parallel but laterally offset, the lower portion of one of said supporting elements being in axial alignment with the upper portion of the other, the other two of said supporting element portions being provided with opposed sets of rack teeth adapted to cooperate with a common pinion, a carriage mounted on and movable relative to both of said supporting elements, a pinion mounted in said carriage and engaging the two sets of rack teeth, a base whereon the free end of one of the aligned portions of the supporting elements is pivoted for movement on a horizontal axis, means carried by the free end of the other of said aligned portions provided with an upwardly opening channel to be manipulated into position beneath the lower edge of a bumper bar, and means for rotating said pinion to effect relative movements of said supporting elements in opposite directions, and a guide member rigidly carried at an end of each supporting element and adapted to engage the aligned and offset portions of the other supporting element in succession as the jack is operated.

CARL W. JOHNSON.
GILBERT M. SMITH.